H. T. HANSEN.
DRIVING MECHANISM FOR MOTOR DRIVEN VEHICLES.
APPLICATION FILED MAY 29, 1905.
902,149.
Patented Oct. 27, 1908.
2 SHEETS—SHEET 2.
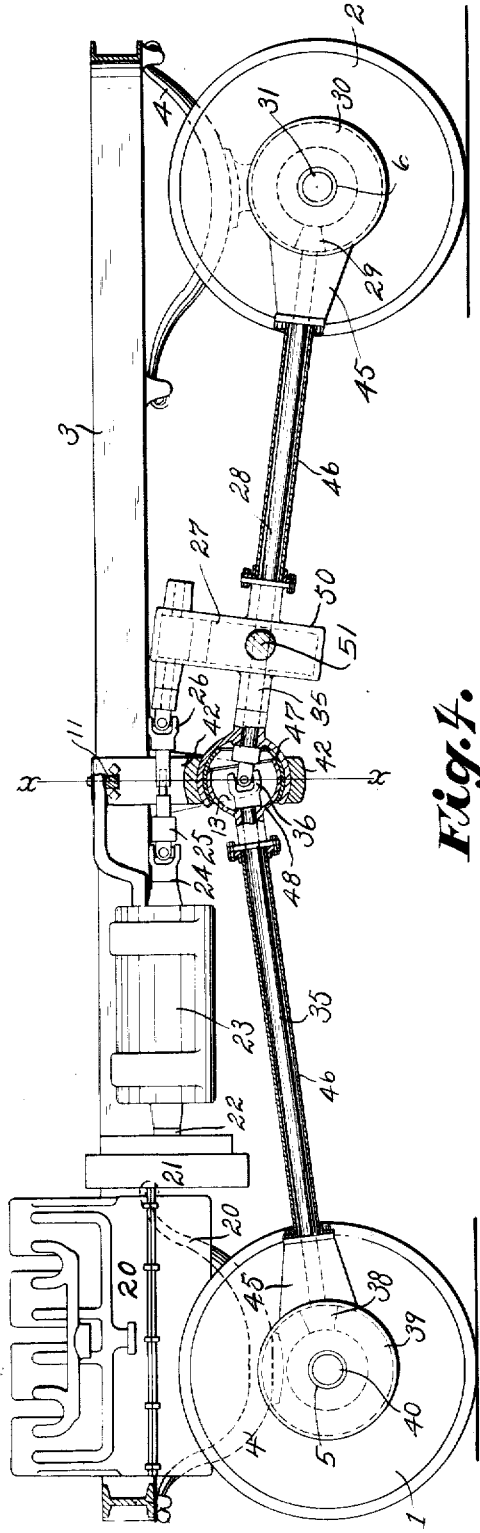
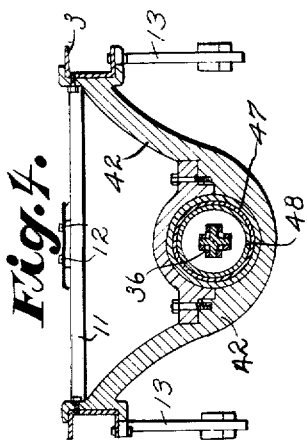
WITNESSES
INVENTOR
Hans Theodore Hansen
BY
Erwin E. Wheeler
ATTORNEYS

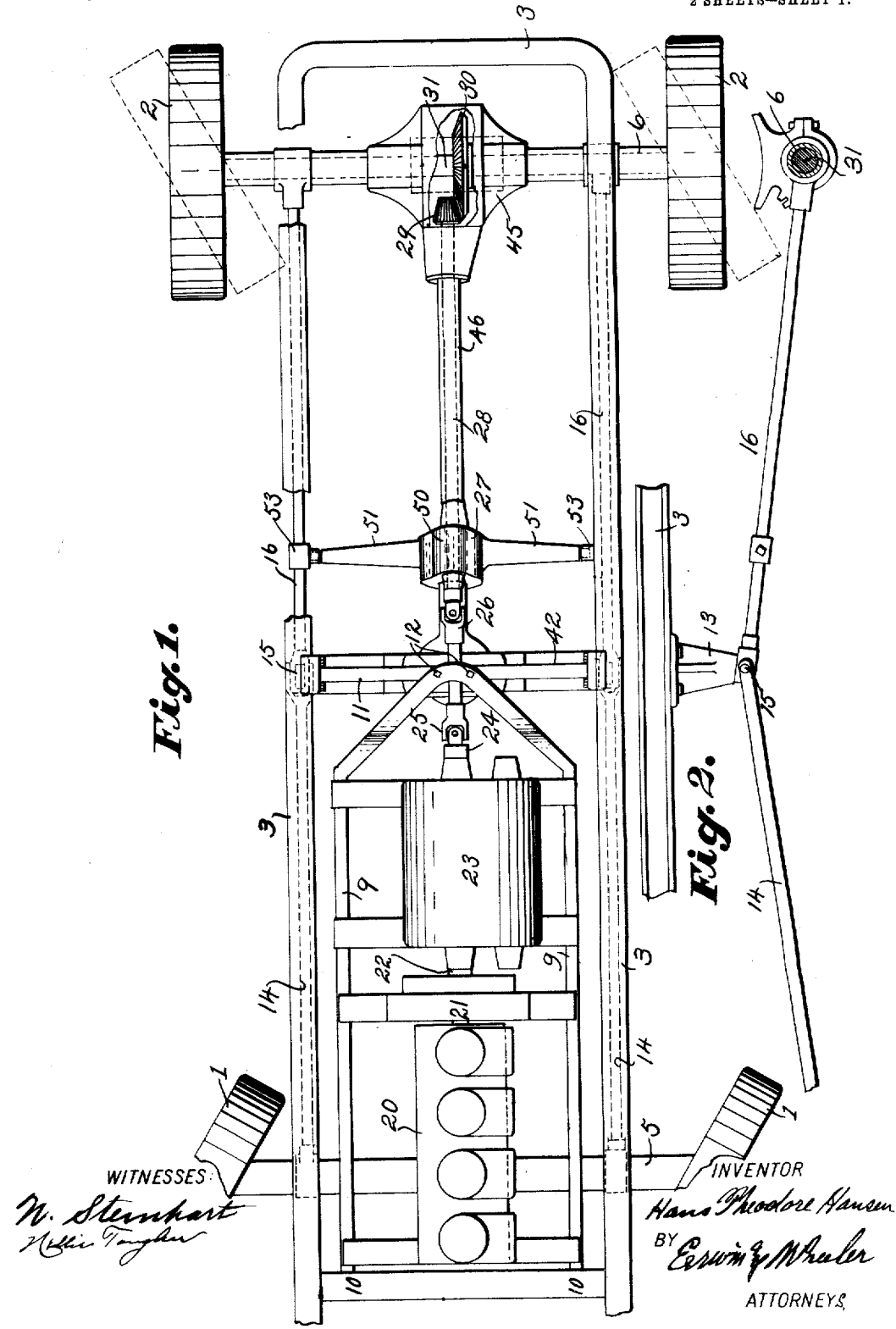

UNITED STATES PATENT OFFICE.

HANS THEODORE HANSEN, OF MILWAUKEE, WISCONSIN, ASSIGNOR, BY MESNE ASSIGNMENTS, TO T. D. LOVERING, OF ST. PAUL, MINNESOTA.

DRIVING MECHANISM FOR MOTOR-DRIVEN VEHICLES.

No. 902,149.   Specification of Letters Patent.   Patented Oct. 27, 1908.

Application filed May 29, 1905. Serial No. 262,760.

*To all whom it may concern:*

Be it known that I, HANS THEODORE HANSEN, a citizen of the United States, residing at Milwaukee, county of Milwaukee, and State of Wisconsin, have invented new and useful Improvements in Driving Mechanism for Motor-Driven Vehicles, of which the following is a specification.

My invention relates to improvements in driving mechanism for motor driven vehicles.

The object of my invention is to provide a form of driving mechanism which will not be affected by the strains due to the jolting or tilting of the vehicle, or any part thereof, and in which the number of joints in the motion transmitting connections will be reduced to a minimum.

A further object of my invention is to provide a form of construction in which the motion transmitting connections may be wholly incased in suitable jointed housings and protected from mud, dust or other foreign matter.

In the following description reference is had to the accompanying drawings, in which Figure 1 is a plan view of my invention as it is applied to the running gear of a vehicle; portions of the frame being removed. Fig. 2 is a detail side view of the central portion of the auxiliary frame. Fig. 3 is a side view of my invention showing portions of the same in central longitudinal section. Fig. 4 is a detail sectional view drawn on line $x\ x$ of Fig. 3.

Like parts are identified by the same reference characters throughout the several views.

1 and 2 are the front and rear wheels of a motor driven vehicle.

3 is a main frame, mounted upon springs 4 and supported from the non-rotatable front and rear axle bars 5 and 6 respectively. An auxiliary frame 9 is supported in the main frame with which it is connected at its front corners 10 and at its rear end the auxiliary frame is centrally connected to a cross bar 11 of the frame as indicated at 12 near the center of the main frame. Hangers 13 are attached to the sides of the main frame near its transverse center and strut rods 14 and 16 extend from these hangers to the non-rotatable axle bars 5 and 6. These strut rods have jointed connection with the hangers at 15.

The motor 20 is supported from the frame 9, and is provided with a fly wheel 21 and shaft 22, which extends into a casing 23, adapted to contain suitable mechanism for varying the speed of the shaft 24 which leads outwardly from the said casing. The shaft 24 is jointed at 25 and 26 and its motion is communicated to the rear wheels through differential gear at 27, shaft 28, bevel pinion 29, and bevel gear wheel 30. The latter is mounted on the rotary axle shaft 31 located within the rear wheel axle 6. The motion of the shaft 24 is also communicated to the front wheels through the differential gear 27 and the shaft 35, which is provided with a universal joint 36 and connected with the front rotary axle shaft 40 by the bevel pinion 38 and gear wheel 39. The joint 36 is in line with the joints of the strut rods and hanger bars at 15.

An inclosing casing for the shafts 28, 35, and for the differential gearing, is centrally supported from the main frame 3 by a yoke 42, and the respective ends of the casing are supported from the non-rotatable axle bars 5 and 6. In the construction shown, this casing is formed in sections. End sections 45 inclose the beveled gear wheels through which motion is transmitted to the rotary axle shafts and these sections 45 connect the end portions of the non-rotatable axles. Tubular sections 46 inclose the shafts 28 and 35 respectively and inner sections 47 and 48 are connected with each other by a universal joint (preferably of the ball and socket type), the members of which comprise concentric spherical shells inclosing the shaft joint 36 and having openings of sufficient size to permit the necessary movement. The outer member of this joint is fitted to the curved inner surface of the yoke 42 which supports it from the main frame.

The casing 50, which incloses the differential gearing 27, is provided with arms 51, which are pivotally connected at their outer ends with sleeves 53 on the strut rods 16, thus permitting a certain mobility of the parts when one of the vehicle wheels is independently raised or lowered.

With the described construction, it is obvious that the rear wheels of the vehicle may be lifted or lowered without strain upon the driving connections or the casings therefor, since these parts swing upon an axis common to the pivotal connection of the strut rods. The vehicle springs permit sufficient longitudinal or separating movement of the axles to compensate for the longitudinal extension of the strut rods and casing 46 as these parts approach a horizontal line during spring compression. The power transmitting connections of the motor are greatly simplified, as but three universal joints are employed in transmitting power to all of the wheels and the motion is transmitted directly from the variable speed shaft 24 to the motion transmitting shafts 28 and 35 through differential gears supported by a casing which also has a universal joint corresponding with the axis of the strut joints and the joint of the shaft 35. The motion transmitting shafts 28 and 35 are provided with suitable bearings in the casing.

The front wheels are preferably used for steering the vehicle, but as the steering mechanism forms no part of the present invention, it is not illustrated. It will also be understood that differential gearing (not shown) will be used in connection with the rotary axle shafts whereby the speed of wheels on opposite sides of the vehicle is permitted to vary, such gearing being common to nearly all motor driven vehicles.

Having thus described my invention what I claim as new and desire to secure by Letters Patent is—

1. In a motor driven vehicle, the combination of a motor mounted on a yielding frame, and connected to drive the four wheels through rotary axle shafts,—said connections comprising a flexible motor shaft, and a set of transmission shafts connected therewith by differential gearing, and operatively connected to drive the respective axle shafts, one of the transmission shafts being flexibly jointed between said differential gearing and the axle shaft, and supported at the joint from the yielding frame.

2. In a motor driven vehicle, the combination with the axle bars, of a main frame yieldingly supported therefrom; a casing connecting the axle bars and supported from the main frame at an intermediate point; a motor mounted on the main frame and provided with jointed power transmitting shafting entering said casing; and power transmitting connections in said casing, operatively connected with said jointed shafting; said casing and power transmitting connections being provided with flexible joints at the point of support from the main frame.

3. In a motor driven vehicle, the combination with the axle bars, of a main frame yieldingly supported therefrom; a casing connecting the axle bars and supported from the main frame at an intermediate point; a motor mounted on the main frame and provided with jointed power transmitting shafting entering said casing; and power transmitting connections in said casing, operatively connected with said jointed shafting; said casing and power transmitting connections being provided with flexible joints at the point of support from the main frame, together with a set of strut rods connected with one of the axle bars and having jointed connection with the main frame in a transverse line through said flexible joints.

4. In a motor driven vehicle, the combination with the axle bars, of a main frame yieldingly supported therefrom; a casing connecting the axle bars and supported from the main frame at an intermediate point; a motor mounted on the main frame; power transmitting connections located in said casing and provided with differential gearing; and a jointed shaft connected to be driven by the motor and arranged to transmit motion to the differential gearing; said power transmitting connections and casing being provided with flexible joints at the point of connection with the main frame.

5. In a motor driven vehicle, having a motor mounted on a yielding frame and connected to drive the four wheels through rotary axle shafts; a flexible motor shaft, and a set of transmission shafts, having gear connection with the motor shaft; one of the transmission shafts being flexibly jointed and supported from the yielding frame; together with a casing for the transmission shafts and gears, having a flexible joint inclosing the joint in the transmission shaft.

6. In a motor driven vehicle, having a motor mounted on a yielding frame and connected to drive the four wheels through rotary axle shafts; a flexible motor shaft, and a set of transmission shafts connected therewith by differential gearing; one of the transmission shafts being flexibly jointed and supported from the yielding frame; said vehicle being also provided with a non-rotatable rear axle connected to the yielding frame by strut rods having jointed connection with the frame substantially in a transverse line extending through the transmission shaft joint.

7. In a motor driven vehicle, having a motor mounted on a yielding frame and connected to drive the four wheels through rotary axle shafts; a flexible motor shaft, and a set of transmission shafts connected therewith by differential gearing; one of the transmission shafts being flexibly jointed and supported from the yielding frame; said vehicle being also provided with non-rotatable axles connected to the yielding frame by strut rods jointed in a transverse line extending through the transmission shaft joint; together with a casing for the transmission shafts and differential gears having a flexible joint inclosing the transmission shaft joint, and also having arms flexibly jointed to the strut rods at an intermediate point.

8. In a motor driven vehicle, having a motor mounted on a yielding frame and connected to drive the four wheels through rotary axle shafts; a flexible motor shaft, and a set of transmission shafts connected therewith by differential gearing; one of the transmission shafts being flexibly jointed and supported from the yielding frame; said transmission shafts and the motor shaft being substantially in the same vertical plane, with the motor shaft crossing the flexible joint of the transmission shaft.

In testimony whereof I affix my signature in the presence of two witnesses.

HANS THEODORE HANSEN.

Witnesses:
 LEVERETT C. WHEELER,
 JAS. B. ERWIN.